United States Patent
Morimitsu

(10) Patent No.: US 8,417,022 B2
(45) Date of Patent: Apr. 9, 2013

(54) STEREO-IMAGE PROCESSING APPARATUS

(75) Inventor: Noboru Morimitsu, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1303 days.

(21) Appl. No.: 12/213,884

(22) Filed: Jun. 25, 2008

(65) Prior Publication Data

US 2009/0046924 A1 Feb. 19, 2009

(30) Foreign Application Priority Data

Jun. 28, 2007 (JP) ................. 2007-170419

(51) Int. Cl.
*G06K 9/00* (2006.01)
*G06K 9/64* (2006.01)
*G06K 9/32* (2006.01)
*G06T 15/00* (2011.01)
*H04N 7/00* (2011.01)
*H04N 13/00* (2006.01)
*H04N 7/18* (2006.01)
*G01C 3/14* (2006.01)
*G01C 3/00* (2006.01)
*G08G 1/01* (2006.01)

(52) U.S. Cl.
USPC ........... 382/154; 382/104; 382/278; 382/294; 345/419; 348/116; 348/42; 348/153; 356/12; 356/3.14; 340/939

(58) Field of Classification Search ................. 382/154, 382/104, 278, 294; 345/419; 348/116, 42, 348/153; 356/12, 3.14; 340/939

See application file for complete search history.

(56) References Cited

U.S. PATENT DOCUMENTS

| | | | | |
|---|---|---|---|---|
| 5,410,346 A | * | 4/1995 | Saneyoshi et al. | 348/116 |
| 5,825,915 A | * | 10/1998 | Michimoto et al. | 382/154 |
| 5,915,033 A | * | 6/1999 | Tanigawa et al. | 382/106 |
| 6,163,337 A | * | 12/2000 | Azuma et al. | 348/43 |
| 6,381,360 B1 | * | 4/2002 | Sogawa | 382/154 |
| 6,385,334 B1 | * | 5/2002 | Saneyoshi et al. | 382/154 |
| 6,477,260 B1 | * | 11/2002 | Shimomura | 382/106 |
| 6,985,619 B1 | * | 1/2006 | Seta et al. | 382/154 |
| 7,092,015 B1 | | 8/2006 | Sogawa | |
| 7,139,424 B2 | * | 11/2006 | Sogawa | 382/154 |
| 7,149,327 B2 | * | 12/2006 | Okamoto et al. | 382/104 |
| 7,260,243 B2 | * | 8/2007 | Shibayama | 382/103 |

(Continued)

FOREIGN PATENT DOCUMENTS

| | | |
|---|---|---|
| JP | 10-283461 | 10/1998 |
| JP | 10-283477 | 10/1998 |
| JP | 2001-92968 | 4/2001 |
| JP | 2003-83742 | 3/2003 |

*Primary Examiner* — Kathleen Y Dulaney

(74) *Attorney, Agent, or Firm* — Smith, Gambrell & Russell, LLP

(57) ABSTRACT

A stereo-image processing apparatus includes a stereo-image taking means configured to take a plurality of images from different viewpoints, a parallax detecting means configured to detect a parallax of a subject on the basis of the images taken by the stereo-image taking means, an object detecting means configured to detect objects on the basis of the parallax detected by the parallax detecting means and a parallax offset value, and a parallax-offset-value correcting means configured to correct the parallax offset value on the basis of a change in a parallax corresponding to an object whose size in real space does not change with time, of the objects detected by the object detecting means, and a change in an apparent size of the object.

15 Claims, 9 Drawing Sheets

U.S. PATENT DOCUMENTS

| | | | |
|---|---|---|---|
| 7,593,597 B2* | 9/2009 | Palum et al. | 382/278 |
| 2003/0026474 A1* | 2/2003 | Yano | 382/154 |
| 2004/0041905 A1* | 3/2004 | Shibayama | 348/47 |
| 2004/0101162 A1* | 5/2004 | Higaki et al. | 382/103 |
| 2004/0105579 A1* | 6/2004 | Ishii et al. | 382/154 |
| 2005/0117781 A1* | 6/2005 | Aoyama | 382/103 |
| 2006/0114320 A1* | 6/2006 | Nagaoka et al. | 348/118 |
| 2006/0115117 A1* | 6/2006 | Nagaoka et al. | 382/104 |
| 2006/0204037 A1* | 9/2006 | Watanabe et al. | 382/104 |
| 2006/0239509 A1* | 10/2006 | Saito | 382/104 |
| 2007/0189599 A1* | 8/2007 | Ryu et al. | 382/154 |
| 2008/0273751 A1* | 11/2008 | Yuan et al. | 382/103 |

* cited by examiner

SECTION Dn  Tz

STEREO-IMAGE PROCESSING APPARATUS

CROSS REFERENCE TO RELATED APPLICATION

The disclosure of Japanese Patent Application No. 2007-170419 filed on Jun. 28, 2007 including the specification, drawings and abstract is incorporated herein by reference in its entirety.

BACKGROUND OF THE INVENTION

1. Field of the Invention

The present invention relates to stereo-image processing apparatuses, and more particularly, to a stereo-image processing apparatus including a stereo-image taking means that takes a plurality of images from different viewpoints.

2. Description of the Related Art

A stereo-image processing apparatus is known. In the stereo-image processing apparatus, a plurality of images of the same object are taken from different viewpoints by a stereo-image taking means such as a pair of right and left cameras, corresponding pixel regions are found in the taken images by stereo matching, and a three-dimensional position of the object is determined by triangulation based on parallaxes of the pixel regions.

In stereo matching, for example, an image taken by one of a pair of cameras serves as a reference image and an image taken by the other camera serves as a comparative image to be compared with the reference image. Correspondingly to a pixel region having a predetermined number of pixels in the reference image, a similar pixel region in the comparative image that has a brightness characteristic closest to the brightness characteristic of the pixels in the pixel region of the reference image is extracted, and both pixel regions are correlated with each other.

In order to determine the three-dimensional position of the object by triangulation, a point $(X, Y, Z)$ in real space and the coordinates $(i, j)$ of a pixel in the reference image are uniquely correlated, for example, by coordinate transformation given by the following Expressions (1) to (3):

$$X = CD/2 + Z \times PW \times (i - IV) \quad (1)$$

$$Y = CH + Z \times PW \times (j - JV) \quad (2)$$

$$Z = CD/(PW \times (dp - DP)) \quad (3)$$

where dp represents the parallax between the corresponding pixel regions in the reference image and the comparative image, a point just below the midpoint between the cameras is designated as the origin, the X-axis indicates the direction in which the cameras are connected, the Y-axis indicates the up-down direction, and the Z-axis indicates the front-rear direction.

Herein, CD represents the distance between the cameras, PW represents the viewing angle for one pixel, CH represents the mounting height of the cameras, and IV and JV respectively represent i and j coordinates of the point at infinity in the reference image in front of the cameras.

DP in Expression (3) is called a vanishing point parallax or an infinite distance corresponding point. In short, DP represents an offset value between the parallax dp between the corresponding pixel regions in the reference image and the comparative image, and the parallax determined so that the actual distance Z of the object in the pixel regions satisfies the condition of Expression (3). Hereinafter, this offset value DP will be referred to as a parallax offset value DP. The parallax offset value DP is determined when a pair of cameras are mounted in the stereo-image processing apparatus, and is fixed at the determined value.

However, the parallax offset value DP sometimes deviates with time, for example, when the optical axis of the camera deviates because of physical stress applied to the camera by mounting the camera by screwing or distortion of the apparatus having the camera due to vibration and heat. If the parallax offset value DP thus deviates, the parallax dp between the reference image and the comparative image does not precisely correspond to the actual distance Z of the object. This decreases the accuracy in determining the three-dimensional position of the object by the above-described stereo matching, and reduces reliability of obtained positional information such as the distance Z of the object.

As a method for correcting the deviation of the parallax offset value DP with time, it is conceivable to detect the deviation with a sensor or the like. Japanese Unexamined Patent Application Publication No. 2001-92968 proposes a stereo matching device that corrects deviation according to images of a screen, on which a plurality of numbered vertical lines are provided, taken by a pair of cameras, without using a sensor. Further, in a monitoring system proposed in Japanese Unexamined Patent Application Publication No. 2003-83742, vanishing points are calculated in images taken by a pair of cameras on the basis of images of white continuous and broken lines marked on the road surface and indoor straight lines such as boundary lines between the wall and the floor, and deviation is corrected on the basis of calculation result.

According to the methods discussed in the above-described publications, deviation of the parallax offset value DP with time can be corrected reliably.

Unfortunately, in the method discussed in Japanese Unexamined Patent Application Publication No. 2001-92968, it is troublesome to bring the screen and take an image of the screen in order to correct the parallax offset value DP. In contrast, in the method discussed in Japanese Unexamined Patent Application Publication No. 2003-83742, correction can be performed only in an environment where a linear object serving as a criterion for calculating the vanishing point, such as a straight traffic line and a linear boundary portion between the wall and floor, extends in front of a pair of cameras.

SUMMARY OF THE INVENTION

The present invention has been made in view of these circumstances, and an object of the invention is to provide a stereo-image processing apparatus that detects a three-dimensional object by correlating a plurality of images taken from different viewpoints by a stereo-image taking means, and that can correct a parallax offset value without using a screen or the like even in an environment where an object serving as a criterion for calculating a vanishing point does not exist.

In order to solve the above-described problems, a stereo-image processing apparatus according to an aspect of the present invention includes a stereo-image taking means configured to take a plurality of images from different viewpoints; a parallax detecting means configured to detect a parallax of a subject on the basis of the images taken by the stereo-image taking means; an object detecting means configured to detect objects on the basis of the parallax detected by the parallax detecting means and a parallax offset value; and a parallax-offset-value correcting means configured to correct the parallax offset value on the basis of a change in a parallax corresponding to an object whose size in real space does not change with time, of the objects detected by the object detecting means, and a change in an apparent size of the object.

In this case, the parallax offset value is corrected on the basis of the change in parallax of an object, whose size in real space does not change with time, and the change in the apparent size of the image in a taken image. For this reason, unlike the above-described related art, the parallax offset value can be corrected by using an object itself whose image is taken by the stereo-image processing apparatus, such as a preceding vehicle, without using another means such as a screen.

The parallax offset value is corrected by using an object whose image is taken by the stereo-image processing apparatus, such as a preceding vehicle. Therefore, even in an environment where a linear object serving as the criterion for calculating the vanishing point, such as a straight traffic line and a linear boundary portion between the wall and floor, does not extend in front of a pair of cameras, unlike the related art, the parallax offset value can be effectively corrected as long as the parallax and the apparent size in the image of the object whose size in real space does not change with time change in the environment.

Preferably, the parallax-offset-value correcting means calculates a parallax error $\epsilon$ on the basis of the changes in the parallax and the apparent size of the object, and corrects the parallax offset value on the basis of the parallax error.

In this case, a parallax error serving as an error between the current parallax and a true parallax corresponding to the distance to an actual object is calculated from the change in the parallax and the change in the apparent size of the object, and the parallax offset value is corrected on the basis of the parallax error. This makes it possible to more precisely correct the parallax offset value and to more accurately achieve the above-described advantages of the invention.

Preferably, the parallax error is designated as $\epsilon$, and the parallax-offset-value correcting means calculates the parallax error $\epsilon$ according to the following expression when the parallax changes from $dp_1$ to $dp_2$ and the apparent size of the object changes from $b_1$ to $b_2$:

$$\epsilon=(b_1 \cdot dp_2 - b_2 \cdot dp_1)/(b_2 - b_1).$$

The parallax-offset-value correcting means corrects the parallax offset value on the basis of the parallax error $\epsilon$.

In this case, the parallax error $\epsilon$ can be easily and accurately calculated according to the above expression using detected parallaxes $dp_1$ and $dp_2$ and detected apparent sizes $b_1$ and $b_2$. This allows the advantages of the invention to be achieved easily and more accurately.

Preferably, the parallax-offset-value correcting means forms a histogram for a plurality of the parallax errors calculated at different times, and corrects the parallax offset value on the basis of the mode of the histogram.

In this case, the parallax offset value is corrected on the basis of a histogram formed for a plurality of parallax errors calculated at different times. Therefore, even when a value greatly different from an actual value is calculated as a parallax error by some influence, the parallax error can be prevented from affecting correction of the parallax offset value, and the advantages of the invention are achieved more accurately.

Preferably, the object detecting means detects a preceding vehicle as the object whose size in real space does not change with time, and the parallax-offset-value correcting means corrects the parallax offset value on the basis of a change in a parallax corresponding to the preceding vehicle and a change in an apparent size of the preceding vehicle in the images serving as the apparent size of the object.

In this case, a preceding vehicle is detected from an image taken by the stereo-image taking means mounted in the vehicle, and the parallax offset value is corrected on the basis of the change in the parallax corresponding to the preceding vehicle and the change in the apparent size of the preceding vehicle in the image. Therefore, when the stereo-image taking means is mounted in the vehicle, the advantages of the invention are properly achieved, and the parallax offset value can be easily and accurately corrected in a preceding-vehicle detecting device using a known stereo-image taking means.

The stereo-image processing apparatus may further include a storage means configured to store the parallax and the apparent size of the object. When the preceding vehicle detected by the object detecting means is exchanged, a history of the parallax and the apparent size of the object stored in the storage means is cleared.

When the preceding vehicle is exchanged with another vehicle because of deviation or cut-in, information about the parallax and apparent size of the preceding vehicle means nothing to the vehicle serving as a new preceding vehicle. For this reason, when the preceding vehicle is exchanged, a history of data on the preceding vehicle stored in the storage means is cleared. This makes it possible to more accurately correct the parallax offset value and to more accurately achieve the advantages of the invention.

The stereo-image processing apparatus may further include a taillight distance detecting means configured to detect a distance between right and left taillights of the preceding vehicle. The parallax-offset-value correcting means corrects the parallax offset value on the basis of a change in the parallax corresponding to the taillights and a change in an apparent distance in the images between the right and left taillights of the preceding vehicle.

Right and left taillights of the preceding vehicle can be used as the object whose size in real space does not change with time. Particularly in a dark environment, for example, at night or in a tunnel, it is possible to effectively detect the changes in the parallax and apparent size, and to correct the parallax offset value on the basis of the changes. In this case in which the right and left taillights of the preceding vehicle are used, the advantages of the invention are achieved accurately.

Preferably, the apparent size of the object is a width of the object in the images.

By using the width of the object in the images as the apparent size of the object, the apparent size of the object can be easily and quickly detected, for example, by counting the number of pixels in the lateral direction in the images of the object. This makes it possible to more easily achieve the advantages of the invention and to increase processing speed.

DESCRIPTION OF THE PREFERRED EMBODIMENT

A stereo-image processing apparatus according to an embodiment of the present invention will be described below with reference to the drawings.

While the stereo-image processing apparatus is installed in a vehicle, a pair of cameras are mounted in the vehicle, and a preceding vehicle running in front of the vehicle is monitored as an object in this embodiment, the present invention is not limited to the embodiment.

Figure 1:
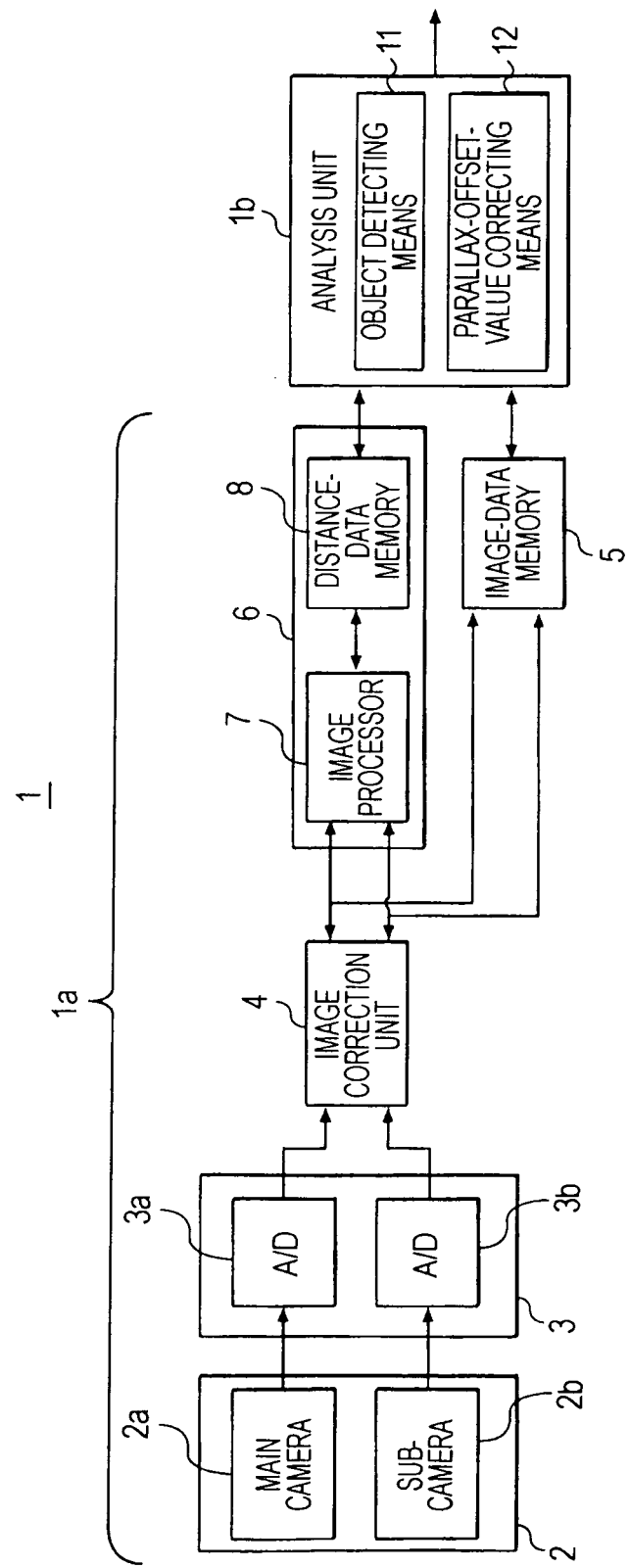
FIG. 1 is a block diagram showing the configuration of a stereo-image processing apparatus according to an embodiment of the present invention.

A stereo-image processing apparatus 1 according to the embodiment includes a data collecting unit 1a and an analysis unit 1b, as shown in FIG. 1. The analysis unit 1b is formed by a computer in which a CPU, a ROM, a RAM, an input/output interface, etc., which are not shown, are connected to a bus. The analysis unit 1b outputs data on taken images and positional information about the detected object to devices provided in the same computer and other ECUs.

In this embodiment, the data correcting unit 1a and an object detecting means 11 of the analysis unit 1b in the stereo-image processing apparatus 1 are based on the vehicle surroundings monitoring apparatus disclosed in Japanese Unexamined Patent Application Publication Nos. 10-283461 and 10-283477 filed earlier by the present applicant. These publications are referred to for details.

In the data collecting unit 1a, a pair of images of the surroundings of the vehicle are taken by a main camera 2a and a sub-camera 2b provided in a stereo-image taking means 2 so as to have different viewpoints. The main camera 2a and the sub-camera 2b are arranged with a fixed interval therebetween in the vehicle width direction. The taken images are converted into digital images by A/D converters 3a and 3b provided in a conversion means 3, and are subjected to image correction, such as removal of displacement and noise and correction of the brightness, by an image correction unit 4. The corrected digital images are stored in an image-data memory 5 and are also transmitted to the analysis unit 1b.

Figure 2:
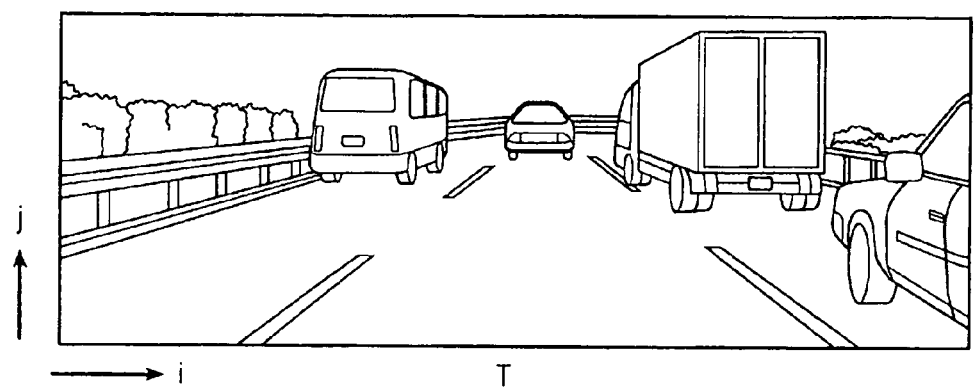
FIG. 2 shows an example of a reference image.

After image correction, the taken images are transmitted to an image processing means 6, and an image processor 7 serving as a parallax detecting means detects a parallax of a subject by correlation between a plurality of images taken by the main camera 2a and the sub-camera 2b. More specifically, an image taken by the main camera 2a, as shown in FIG. 2 (hereinafter referred to as a reference image T) is divided into a plurality of pixel blocks (not shown). Correspondingly to the pixel blocks, pixel blocks of an image taken by the sub-camera 2a are found by stereo matching, and a parallax dp is calculated for each pixel block.

In this embodiment, in stereo matching performed by the image processor 7, for example, the reference image T is divided into pixel blocks each having 4 by 4 pixels. Then, a pixel block having the smallest city block distance CB given by the following Expression (4) is selected from pixel blocks, each having 4 by 4 pixels, in an image taken by the sub-camera 2b (hereinafter referred to as a comparative image) correspondingly to the pixel blocks of the reference image T:

$$CB = \Sigma |p1 - p2| \quad (4)$$

where p1 and p2 respectively represent the sum of brightnesses of pixels (sixteen pixels) in the reference image T and the comparative image.

When a pixel block having the smallest city block distance CB is found in the comparative image, the image processor 7 calculates, as a parallax dp, the amount of deviation between the found pixel block in the comparative image and the pixel block in the reference image T. This calculation of the parallax dp is performed for every pixel block in the reference image T.

As described above, the parallax dp at the coordinates (i, j) of the pixel in the reference image T is uniquely correlated with the position (X, Y, Z) in real space according to triangulation using the following expressions:

$$X = CD/2 + Z \times PW \times (i - IV) \quad (5)$$

$$Y = CH + Z \times PW \times (j - JV) \quad (6)$$

$$Z = CD/(PW \times (dp - DP)) \quad (7)$$

where CD, PW, CH, IV, and JV are the same as above, and DP represents the parallax offset value indicating the offset of the parallax dp.

The image processing means 6 assigns the parallaxes dp calculated by the image processor 7 to the pixel blocks in the reference image T, stores the parallaxes dp in a distance-data memory 8, and transmits information about the parallaxes dp to the analysis unit 2b. Hereinafter, an image formed by the pixel blocks with the assigned parallaxes dp in the reference image T will be referred to as a distance image Tz. The distance image Tz is image-like data in which the parallaxes dp are respectively assigned to the pixel blocks, as shown in FIG. 3.

The analysis unit 1b includes an object detecting means 11 and a parallax-offset-value correcting means 12.

The object detecting means 11 detects objects in the reference image T according to the above Expressions (5) to (7) on the basis of the parallaxes dp and the parallax offset values DP detected by the image processor 7 serving as the parallax detecting means. While the configuration of the object detecting means 11 is discussed in detail in Japanese Unexamined Patent Application Publication Nos. 10-283461 and 10-283477, as described above, main points thereof will be briefly described below.

Figure 3:
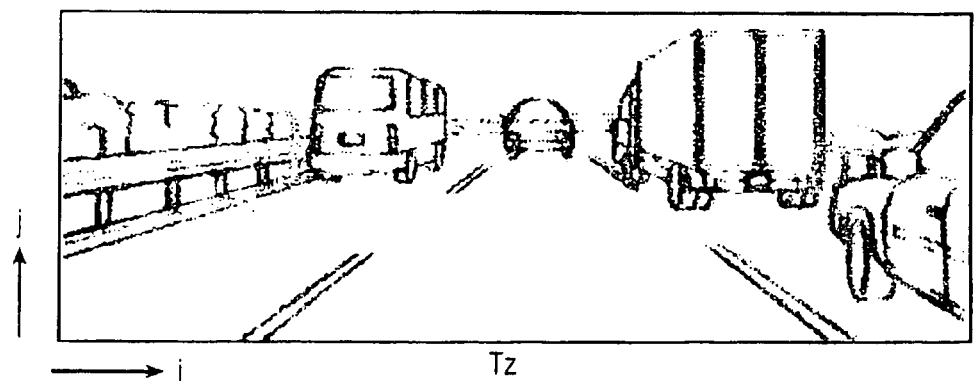
FIG. 3 shows a distance image calculated on the basis of the reference image shown in FIG. 2.
Figure 4:
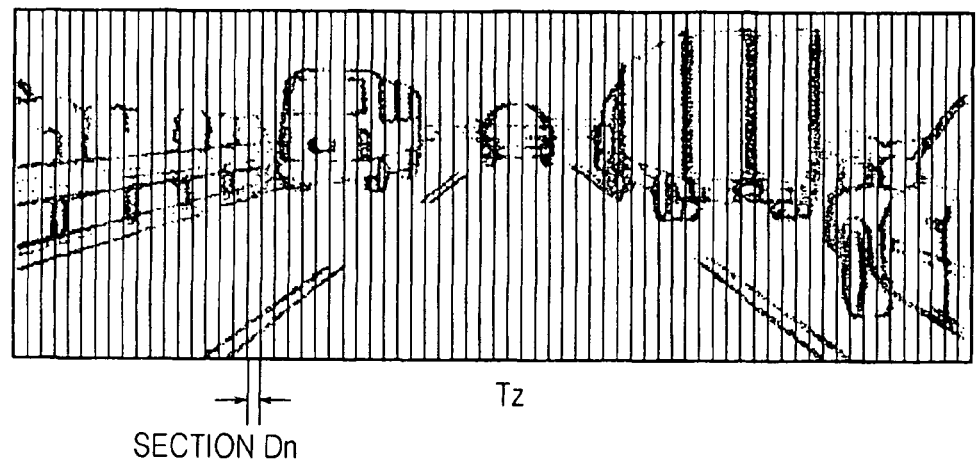
FIG. 4 shows sections of the distance image.
Figure 5:
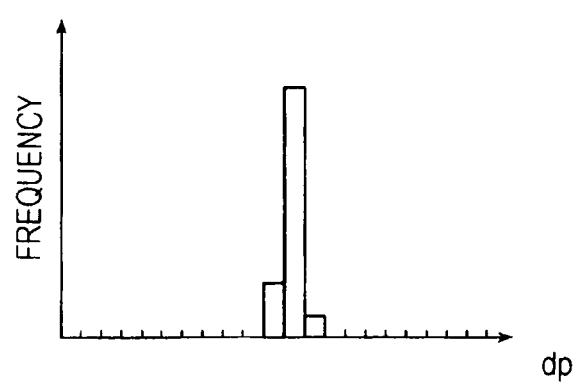
FIG. 5 shows a histogram for finding the mode of parallaxes in the sections.

The object detecting means 11 divides the distance image Tz shown in FIG. 3 into vertical strip sections Dn each having a predetermined width, as shown in FIG. 4. The object detecting means 11 forms a histogram relating to parallaxes dp provided above the road surface, of the parallaxes included in each section Dn, and sets the mode of the histogram as a parallax dp of the section Dn, as shown in FIG. 5. This operation is performed for all sections Dn.

Figure 6:
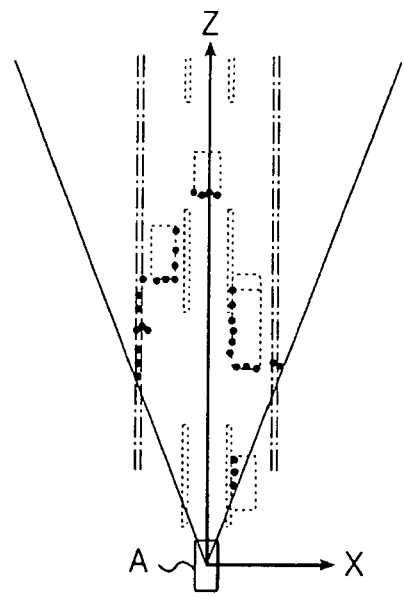
FIG. 6 shows dots formed by plotting distances calculated from the parallaxes of the sections in real space.

Then, the object detecting means 11 reads out the parallax offset values DP from a storage means (not shown), and substitutes the parallaxes dp of the sections Dn into the above Expression (7), thus calculating the distances Z between the vehicle and the objects. When the calculated distances Z are plotted in real space, they are plotted as dots with some variations in portions of forward objects facing a vehicle A in which the stereo-image processing apparatus 1 is mounted, as shown in FIG. 6.

Figure 7:
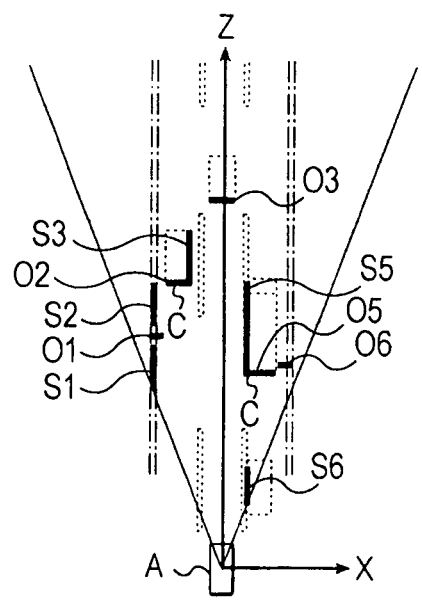
FIG. 7 explains objects detected by grouping the dots shown in FIG. 6.
Figure 8:
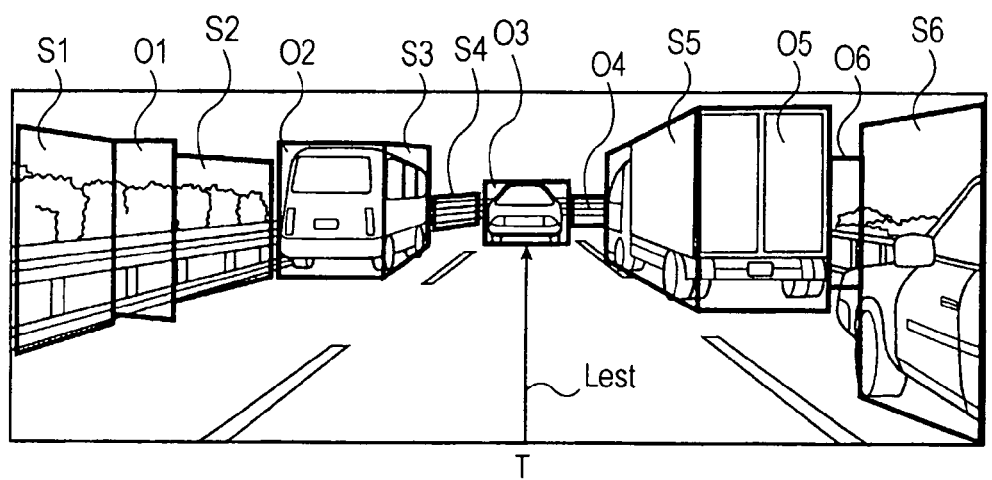
FIG. 8 shows the objects detected in FIG. 7 and enclosed by frames on the reference image.
Figure 9:
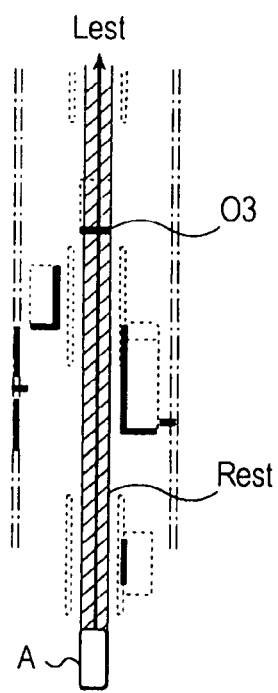
FIG. 9 explains a traveling locus and a traveling path of a vehicle and a detected preceding vehicle.

The object detecting means 11 searches for the distances from each of the dots plotted in real space to the adjacent dots in the X- and Z-axis directions and the total length in the X-axis direction between the leftmost dot to the rightmost dot in a group into which the dots are classified. Then, the object detecting means 11 classifies dots having values within set threshold ranges into groups, and subjects the dots in the groups to collinear approximation so as to detect objects, as shown in FIG. 7. In this embodiment, the objects thus detected by the object detecting means 11 are enclosed by rectangular frames in the reference image T, as shown in FIG. 8. In FIGS. 7 to 9, labels O and S represent the types of faces of the objects facing the vehicle A. Label O shows that a rear face of an object is detected, and label S shows that a side face of the object is detected.

From the detected objects, the object detecting means 11 detects a preceding vehicle as an object whose size in real space does not change with time. More specifically, the object detecting means 11 first estimates, as a traveling locus Lest, a locus that the vehicle A will form during future driving, on the basis of the behavior of the vehicle A, as shown in FIG. 9. Then, the object detecting means 11 detects, as a preceding vehicle, an object closest to the vehicle A, of the objects existing on a traveling path Rest having a width equal to the width of the vehicle A and centered on the traveling locus Lest. For example, a car O3 is detected as a preceding vehicle in FIG. 9.

The traveling locus Lest of the vehicle A can be calculated from the turning curvature Cua of the vehicle A. The turning curvature Cua is calculated according to the following Expression (8) or the following Expressions (9) and (10) on the basis of the vehicle speed V of the vehicle A, the yaw rate γ, the steering angle δ of the steering wheel, etc:

$$Cua=\gamma/V \qquad (8)$$

$$Re=(1+Asf \cdot V^2) \cdot (Lwb/6) \qquad (9)$$

$$Cua=1/Re \qquad (10)$$

where Re represents the turning radius, Asf represents the stability factor of the vehicle, and Lwb represents the wheel base.

The object detecting means 11 can detect the exchange between preceding vehicles, for example, when a detected preceding vehicle comes out of the front of the vehicle A and a vehicle in front of the detected vehicle becomes a new preceding vehicle, or when another vehicle cuts in between the vehicle A and the preceding vehicle so as to become a new preceding vehicle.

More specifically, when a vehicle detected as a preceding vehicle deviates from the traveling path Rest of the vehicle A and a new preceding vehicle is detected in front of the vehicle A on the traveling path Rest, the object detecting means 11 judges that the preceding vehicle has been exchanged because of deviation. Further, when another vehicle is detected on the traveling path Rest between the vehicle detected as the preceding vehicle and the vehicle A so as to be a new preceding vehicle, the object detecting means 11 judges that the preceding vehicle has been exchanged because of cut-in.

The object detecting means 11 can adopt any method for detecting the preceding vehicle as long as the method can detect the preceding vehicle and deviation of the preceding vehicle and cut-in of another vehicle. For example, the preceding vehicle may be detected by using a radar.

The parallax-offset-value correcting means 12 corrects the parallax offset value DP used in calculation according to Expression (7). In this embodiment, the parallax-offset-value correcting means 12 calculates a parallax offset value DP on the basis of the parallax dp detected by the image processor 7 serving as the parallax detecting means, the size of the object detected by the object detecting means 11, and changes in the parallax and size, and corrects the calculated parallax offset value DP.

A procedure performed by the parallax-offset-value correcting means 12 will be described below with reference to FIGS. 10 and 11 serving as flowcharts. In addition, the operation of the stereo-image processing apparatus 1 according to this embodiment will be described.

In an initial state of the stereo-image processing apparatus 1, a detection-completion flag F indicating completion of detection, which will be described below, is set at 0.

First, the parallax-offset-value correcting means 12 judges whether a preceding vehicle is detected by the object detecting means 11 (Step S1). When a preceding vehicle is not detected (Step S1; NO), the parallax-offset-value correction means 12 stands by until a preceding vehicle is detected.

When a preceding vehicle is detected by the object detecting means 11 (Step S1; YES), the parallax-offset-value correcting means 12 judges, on the detection result, whether deviation of the preceding vehicle or cut-in of another vehicle is detected and the preceding vehicle is exchanged (Step S2). When the preceding vehicle is exchanged (Step S2; YES), a parallax $dp_1$ corresponding to the preceding vehicle and an apparent size $b_1$ of the preceding vehicle stored in the storage means are cleared (Step S3), as will be described below, and the detection-completion flag F is reset to 0 (Step S4).

When the preceding vehicle is not exchanged (Step S2; NO) and the detection-completion flag F is not 1, but 0 (Step S5; NO), the parallax-offset-value correcting means 12 calculates an apparent size b of the preceding vehicle in the reference image T (Step S6).

In this embodiment, as described above, the preceding vehicle O3 is detected in the reference image T in a manner such as to be enclosed by a frame, as shown in FIG. 8. Therefore, the parallax-offset-value correcting means 12 calculates the size of the preceding vehicle as the number of pixels in the frame. Further, the width of the preceding vehicle is used as the apparent size b of the preceding vehicle. In the example shown in FIG. 8, the parallax-offset-value correcting means 12 calculates the number of pixels corresponding to the width of the frame enclosing the preceding vehicle O3 as an apparent size b of the preceding vehicle.

Subsequently, the parallax-offset-value correcting means 12 stores the calculated apparent size b of the preceding vehicle in the reference image T as a reference size $b_1$ in the storage means, and also stores the parallax dp corresponding to the preceding vehicle as a reference parallax $dp_1$ (Step S7). When the parallax dp corresponding to the preceding vehicle has variations, as shown in FIG. 6, for example, the mode of a histogram representing the parallaxes dp corresponding to the preceding vehicle is stored as the reference parallax $dp_1$ corresponding to the preceding vehicle.

Then, the parallax-offset-value correcting means 12 sets the detection-completion flag F at 1 (Step S8). In this way, setting the detection-completion flag F at 1 means that the parallax $dp_1$ and apparent size $b_1$ as references for correcting the parallax offset value are detected. When the preceding vehicle is exchanged (Step S2; YES), the parallax $dp_1$ and size $b_1$ of the preceding vehicle before exchange are cleared, because they mean nothing to a new preceding vehicle (Step S3). In order to show that the reference parallax $dp_1$ and size $b_1$ are not detected, the detection-completion flag F is reset to 0 (Step S4).

When the preceding vehicle is detected (Step S1; YES) and is not exchanged (Step S2; NO), and the detection-completion flag F is 1 (Step S5; YES), the parallax-offset-value correcting means 12 judges whether a parallax dp of the preceding vehicle detected in the current sampling period has changed relative to the reference parallax $dp_1$ stored in the storage means to a sufficient extent to accurately calculate a parallax error ε that will be described below (Step S9).

In this embodiment, when the parallax dp of the preceding vehicle detected in the current sampling period has changed relative to the reference parallax $dp_1$ by a predetermined rate of, for example, at least 20%, the parallax-offset-value correcting means 12 judges that the parallax dp has sufficiently changed. Alternatively, sufficient change can be judged, for example, by detecting that an absolute value of the difference between the currently detected parallax dp and the reference parallax $dp_1$ is more than or equal to a predetermined value, that a distance Z converted from the currently detected parallax dp according to the above-described Expression (7) has changed relative to a distance based on the reference parallax $dp_1$ by a predetermined rate or more, or that an absolute value of the difference between the distances is more than or equal to a predetermined value.

When the parallax dp of the preceding vehicle has not sufficiently changed relative to the reference parallax $dp_1$ (Step S9; NO), the above-described processing routine is repeated.

When the parallax-offset-value correcting means 12 judges, according to the above-described criterion, that the currently detected parallax dp has sufficiently changed relative to the reference parallax $dp_1$ (Step S9; YES), it calculates a size b of the preceding vehicle similarly to the above (Step S10 in FIG. 11), and stores the size b as a currently detected size $b_2$ in the storage means. Moreover, the parallax-offset-value correcting means 12 stores the currently detected parallax dp as a parallax $dp_2$ in the storage means (Step S11).

Subsequently, the parallax-offset-value correcting means 12 calculates a parallax error ε to be used to correct the parallax offset value DP, on the reference parallax $dp_1$ and size $b_1$ and the currently detected parallax $dp_2$ and size $b_2$ stored in the storage means (Step S12).

A description will now be given of the principle of calculation of the parallax error ε.

Figure 12:
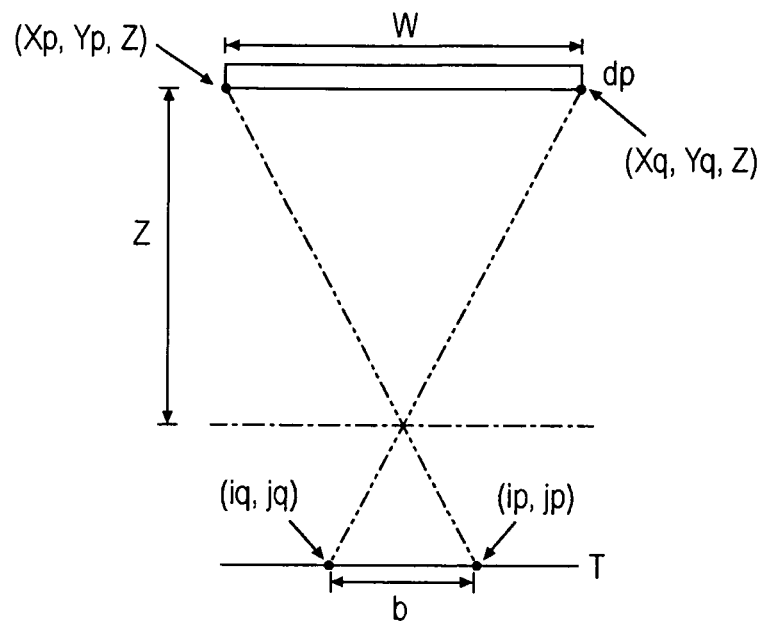
FIG. 12 explains the relationship among the width of an object and the apparent size of the object in the reference image, and the parallax.

As shown in FIG. 12, it is assumed that an object having a width W exists in front of and at a distance Z from the stereo-image taking means 2, and that the coordinates of a left end of the object in real space is designated as (Xp, Yp, Z), and the coordinates of a right end of the object in real space is designated as (Xq, Yq, Z). In this case, the width W of the object is expressed as follows:

$$W = Xq - Xp \quad (11)$$

Further, when it is assumed that the coordinates of a left end of the object in a reference image T is designated as (ip, jp) and the coordinates of a right end is designated as (iq, jq), an apparent size b of the object in the reference image T is expressed as follows:

$$b = iq - ip \quad (12)$$

Since Xq, Xp, iq, ip, and the distance Z satisfy the above-described conditions of Expressions (5) to (7), the following relationships are provided:

$$Xp = CD/2 + Z \times PW \times (ip - IV) \quad (13)$$

$$Xq = CD/2 + Z \times PW \times (iq - IV) \quad (14)$$

By substituting these expressions into Expression (11) and further substituting Expression (12), the width W of the object is given by the following expression:

$$\begin{aligned} W &= Xq - Xp \\ &= (CD/2 + Z \times PW \times (iq - IV)) - (CD/2 + Z \times PW \times (ip - IV)) \\ &= Z \times PW \times (iq - ip) \\ &= Z \times PW \times b \end{aligned} \quad (15)$$

For easier explanation, when it is assumed that the parallax offset value DP is 0 and Z in Expression (7) is substituted into Expression (15), the width W is expressed as follows:

$$\begin{aligned} W &= CD/(PW \times dp) \times PW \times b \\ &= b \times CD/dp \end{aligned}$$

Therefore, the relationship between the parallax dp and the apparent size b of the object in the reference image T is given by the following expression:

$$b = (W/CD) \times dp \quad (16)$$

Figure 13:
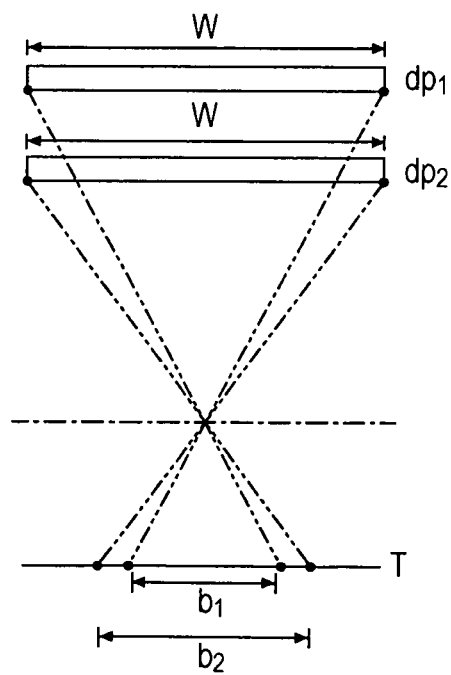
FIG. 13 explains the relationship between changes in the apparent size of the object and changes in the parallax between different sampling periods.

In Expression (16), CD represents the distance between the main camera 2a and the sub-camera 2b, as described above. When it is assumed that the width W of the object in real space does not change with time, W/CD is a constant that does not depend on time. As shown in FIG. 13, a parallax $dp_1$ and an apparent size $b_1$ of the object in the reference image T, which are detected in a certain sampling period $t_1$, satisfy the above condition of Expression (16) and a parallax $dp_2$ and an apparent size $b_2$ of the object in the reference image T, which are detected in a different sampling period $t_2$, also satisfy the condition of Expression (16). Therefore, there is the following relationship among $dp_1$, $b_1$, $dp_2$, and $b_2$:

$$dp_2/dp_1 = b_2/b_1 \quad (17)$$

However, when the parallax offset value, which is temporarily set at 0, deviates with time and a parallax error ε occurs, a detected parallax dp also deviates. In this case, the detected parallax dp is given by the following expression:

$$dp = dp^* - \epsilon \quad (18)$$

where $dp^*$ represents the true parallax corresponding to the actual distance Z. Therefore, the true parallax $dp^*$ is expressed as follows:

$$dp^* = dp + \epsilon \quad (19)$$

Since the true parallax $dp^*$ satisfies the above condition of Expression (17), the left side of Expression (17) is rewritten by using a true parallax $dp_1^*$ in the sampling period $t_1$ and a true parallax $dp_2^*$ in the sampling period $t_2$ as follows:

$$dp_2^*/dp_1^* = b_2/b_2 \quad (20)$$

By substituting Expression (19) into Expression (20), the relationship between the detected parallaxes $dp_1$ and $dp_2$ and the detected apparent sizes $b_1$ and $b_2$ is expressed as follows:

$$(dp_2 + \epsilon)/(dp_1 + \epsilon) = b_2/b_1 \quad (21)$$

By transforming Expression (21) for the parallax error ε, when the parallax changes from $dp_1$ to $dp_2$ and the apparent size of the object in the reference image T correspondingly changes from $b_1$ to $b_2$, the parallax error $\epsilon$ is given by the following Expression (22):

$$\epsilon = (b_1 \cdot dp_2 - b_2 \cdot dp_1)/(b_2 - b_1) \tag{22}$$

In this way, the parallax error $\epsilon$ can be calculated from the detected parallaxes $dp_1$ and $dp_2$ and the detected apparent sizes $b_1$ and $b_2$.

As shown in Expression (22), the denominator of the parallax error $\epsilon$ is the difference between the apparent sizes $b_1$ and $b_2$ of the object. Therefore, the parallax error $\epsilon$ can be more accurately calculated when the apparent sizes $b_1$ and $b_2$ and the parallaxes $dp_1$ and $dp_2$ detected in different sampling periods are different from each other to some degree. Accordingly, in this embodiment, the parallax error $\epsilon$ is calculated only when it is judged in Step S9 in FIG. 10 that the parallax dp of the preceding vehicle detected in the current sampling period has sufficiently changed relative to the reference parallax $dp_1$ stored in the storage means (Step S9; YES), as described above.

A description will now be given of a method for correcting the parallax offset value DP by using the parallax error $\epsilon$. Since the relationship between the distance Z and the parallax dp in Expression (7) originally should hold between the true parallax dp* and the distance Z, Expression (7) is rewritten using the true parallax dp* as follows:

$$Z = CD/(PW \times (dp^* - DP)) \tag{23}$$

By substituting the above Expression (19) into Expression (23), the distance Z is expressed as follows:

$$Z = CD/(PW \times (dp + \varepsilon - DP)) \tag{24}$$
$$= CD/(PW \times dp - (DP - \varepsilon)))$$

In other words, correction can be made so that the value obtained by subtracting the parallax error $\epsilon$ calculated by Expression (22) from the current parallax offset value DP serves as a new parallax offset value. When the parallax error $\epsilon$ is calculated as a negative value, of course, the sum of the current parallax offset value DP and the absolute value of the parallax error $\epsilon$ is calculated as a new parallax offset value.

Figure 11:
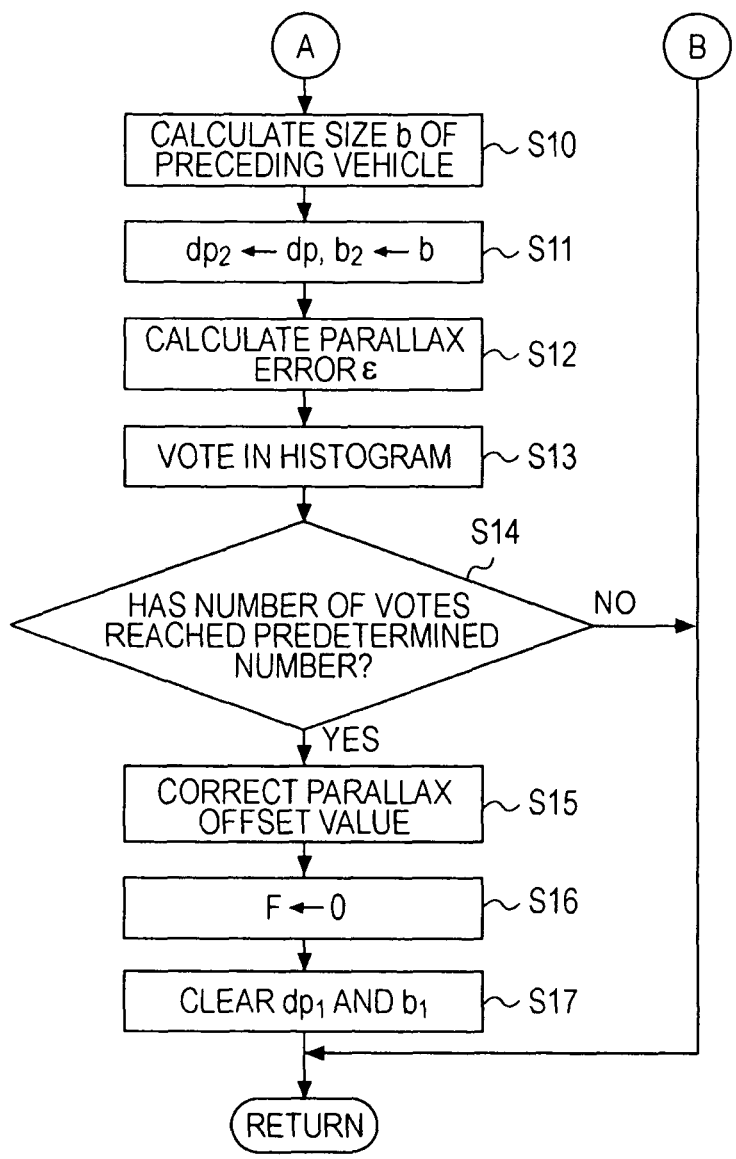
FIG. 11 is a flowchart showing the procedure performed by the parallax-offset-value correcting means in the embodiment.

The parallax-offset-value correcting means 12 calculates a parallax error $\epsilon$ to be used for correction of the parallax offset value DP by substituting the previous parallax $dp_1$ and apparent size $b_1$ stored in the storage means and the currently detected parallax $dp_2$ and apparent size $b_2$ into the above Expression (22) (Step S12 in FIG. 11).

The parallax offset value DP can be immediately corrected by using the parallax error $\epsilon$ thus calculated. However, in this embodiment, the parallax-offset-value correcting means 12 form a histogram for a plurality of parallax errors $\epsilon$ calculated in different sampling periods, as described above, and corrects the parallax offset value DP on the basis of the mode of the histogram by the above-described method. This is because the parallax offset value DP does not frequently change in a short period, and the detected parallaxes $dp_1$ and $dp_2$ and apparent sizes $b_1$ and $b_2$ include detection errors.

Figure 14:
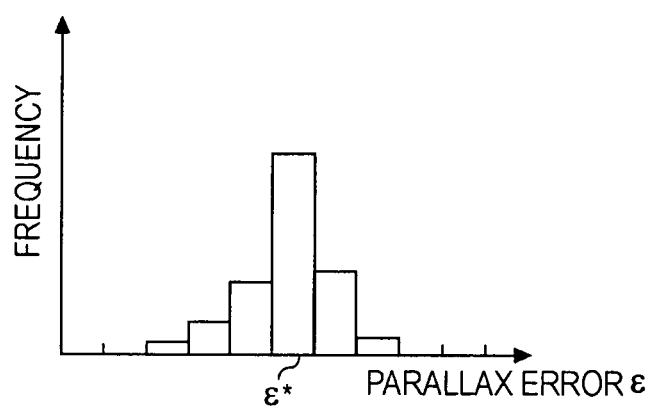
FIG. 14 shows a histogram for calculating the mode of parallax errors.

For this reason, the parallax-offset-value correcting means 12 gives a vote of the parallax error $\epsilon$, which is calculated in the current sampling period by the above-described manner, into a histogram shown in FIG. 14 (Step S13). In this embodiment, the parallax-offset-value correcting means 12 judges whether the number of votes in the histogram has reached a predetermined number (Step S14).

When the number of votes has not reached the predetermined number (Step S14; NO), the above-described processing routine is repeated, and votes of parallax error $\epsilon$ are given into the histogram.

When the number of votes has reached the predetermined number (Step S14; YES), the parallax-offset-value correcting means 12 calculates the mode $\epsilon^*$ of the parallax error $\epsilon$ from the histogram, corrects the parallax offset value by subtracting the mode $\epsilon^*$ of the parallax error $\epsilon$ from the current parallax offset value DP, as described above (Step S15), and stores the corrected value as a new parallax offset value DP in the storage means.

Then, the parallax-offset-value correcting means 12 resets the detection-completion flag F to 0 (Step S16), and clears the reference parallax $dp_1$ and reference apparent size $b_1$ stored in the storage means (Step S17). In this embodiment, the frequency of the histogram is reset, and the above-described processing routine is repeated.

The object detecting means 11 reads out the parallax offset value DP thus corrected and stored in the storage means, and calculates the distance Z from the corrected parallax offset value DP according to Expression (7).

As described above, the parallax-offset-value correcting means 12 calculates the mode $\epsilon^*$ of the parallax error $\epsilon$, and corrects the parallax offset value DP. Subsequently, the parallax-offset-value correcting means 12 resets the detection-completion flag F to 0 (Step S16), clears $dp_1$ and $b_1$ (Step S17), calculates a new reference apparent size $b_1$ of the preceding vehicle (Step S6 in FIG. 10), and stores the apparent size $b_1$ and the reference parallax $dp_1$ in the storage means (Step S7). Alternatively, the apparent size $b_1$ and the parallax $dp_1$ may be stored without being cleared even after the parallax offset value DP is corrected. In this case, the detection-completion flag F is kept at 1 after correction of the parallax offset value DP.

For example, the parallax $dp_2$ and apparent size $b_2$ detected last may be stored in the storage means as a parallax $dp_1$ and an apparent size $b_1$ serving as the reference for correction of the parallax offset value DP. In this case, the detection-completion flag F is also kept at 1 even after the parallax offset value DP is corrected.

In this embodiment, the frequency of the histogram is reset after the mode $\epsilon^*$ of the parallax error $\epsilon$ is calculated so as not to have any influence on the next correction of the parallax offset value DP. Instead, some influence may be exerted on the next correction of the parallax offset value DP, for example, by using the frequency in each category in the current histogram for the next histogram or using a predetermined proportion of the frequency in the category.

Figure 10:
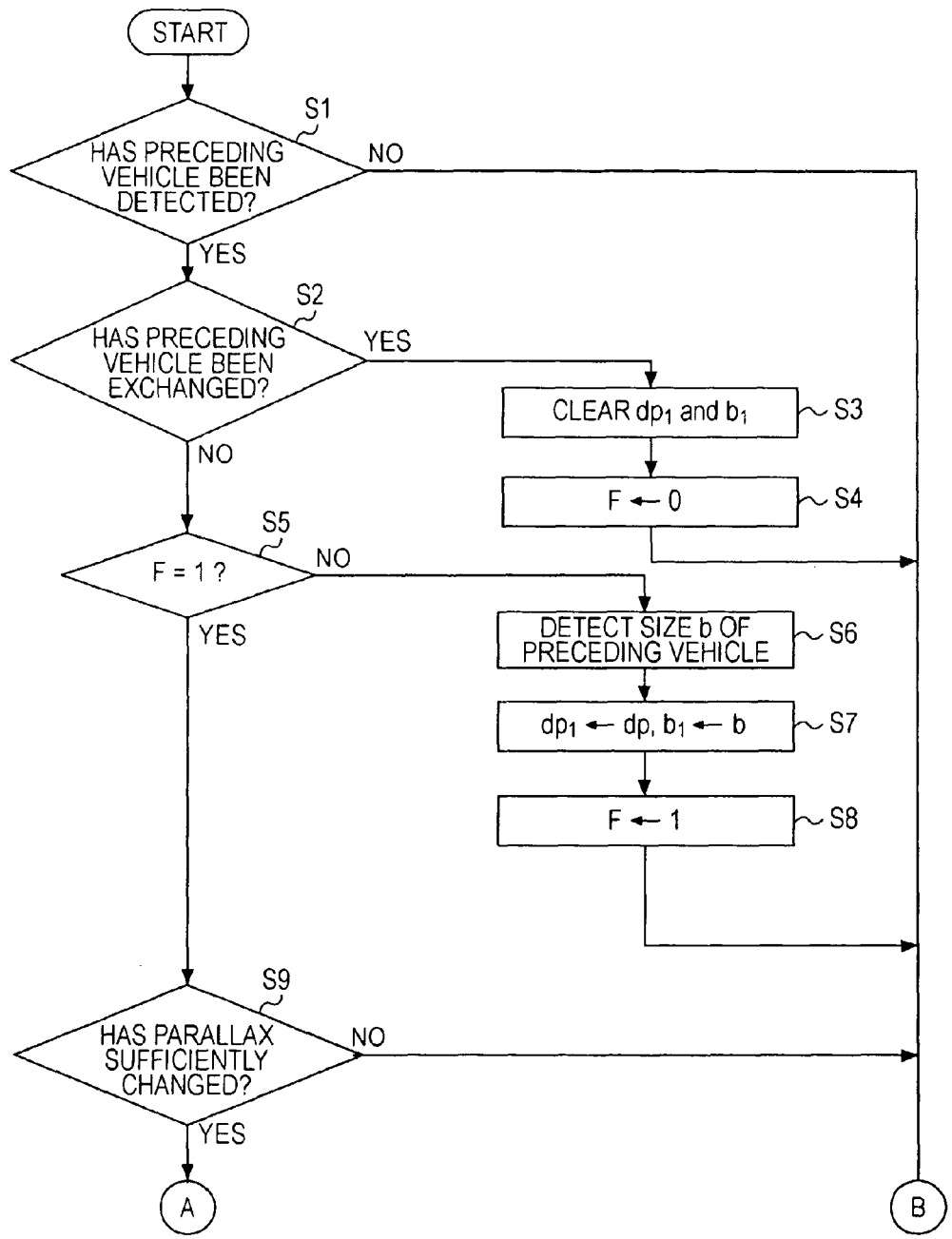
FIG. 10 is a flowchart showing a procedure performed by a parallax-offset-value correcting means in the embodiment.

In this embodiment, when the preceding vehicle is exchanged (Step S2 in FIG. 10; YES), the parallax $dp_1$ and size $b_1$ of the preceding vehicle before exchange are cleared because they mean nothing to a new preceding vehicle, as described above (Step S3). Since the parallax error $\epsilon$ itself does not change even when the preceding vehicle is exchanged, the frequency of the histogram is not cleared even when the preceding vehicle is exchanged. However, the frequency of the histogram can be cleared at the time when the preceding vehicle is exchanged.

As described above, in the stereo-image processing apparatus 1 according to this embodiment, the parallax offset value DP is corrected by calculating the parallax error on the basis of the parallaxes and the apparent sizes in the image of an object, such as a preceding vehicle, whose size in real space does not change with time, which are detected in different sampling periods. For this reason, unlike the above-described related art, the parallax offset value DP can be corrected without using another means such as a screen, but by using an object whose image is taken by the stereo-image processing apparatus 1, such as a preceding vehicle.

Since the parallax offset value DP is corrected by using the object whose image is taken by the stereo-image processing apparatus 1, even in an environment where a linear object serving as the criterion for calculating the vanishing point, for example, straight traffic lines extending in front of a pair of cameras and a linear boundary line between the wall and floor, does not exist, the parallax offset value DP can be effectively corrected as long as the parallax of the object, whose size in real space does not change with time, and the apparent size of the object in the taken image change.

While the parallax offset value DP is corrected on the basis of changes in the parallax and apparent size of the preceding vehicle with attention of the width of the preceding vehicle in this embodiment, attention may be paid to, for example, the length or area of the object as the size of the object.

For example, the distance between right and left taillights of the preceding vehicle in real space does not change with time. For this reason, the stereo-image processing apparatus 1 may be provided with a known taillight-distance detecting means that detects the distance between the right and left taillights of the preceding vehicle, and the parallax offset value DP may be corrected on the basis of the change in the parallax corresponding to the right and left taillights and the apparent distance between the taillights in the taken image.

The distance between the taillights may be detected as the distance between the centers of the right and left taillights, or the distance between the outer or inner ends of the right and left taillights.

In this embodiment, an object, such as a preceding vehicle, existing above the road surface, that is, the reference plane on which the stereo-image taking means 2 is placed, is used as an object whose size in real space does not change with time. The object whose size in real space does not change with time may be any object whose parallax and apparent size in the image can be detected. The object includes, for example, a pattern on the surface of the plane and a mark provided on the plane.

While the stereo-image processing apparatus 1 is installed in the vehicle in the embodiment, the present invention is also applicable to a case in which the parallax offset value DP of the stereo-image taking means is corrected in an automotive robot that moves while taking an image of its surroundings and making judgment by itself. The present invention can be applied to any stereo-image processing apparatus that can take an image of an object, whose size in real space does not change with time, in a state in which the distance to the object is variable.

In the embodiment, a value obtained by subtracting the parallax error $\epsilon$ from the current parallax offset value DP serves as a new parallax offset value, as shown in Expression (24). For example, the parallax error $\epsilon$ may be adjusted by a fixed gain g, and a value DP-gx$\epsilon$ obtained by subtracting the product of the fixed gain g and the parallax error $\epsilon$ from the current parallax offset value DP may serve as a new parallax offset value.

While the parallax dp is used as distance information in the embodiment, since the parallax dp and the distance Z can be uniquely correlated according to Expression (7), a case in which processing similar to that in the present invention is performed while converting the parallax dp into the distance Z can be equivalent to the present invention.

What is claimed is:

1. A stereo-image processing apparatus, comprising:
   stereo-image taking means configured to take a plurality of images from different viewpoints;
   parallax detecting means configured to detect parallax of a subject based on the images taken by the stereo-image taking means;
   object detecting means configured to detect objects based on parallax detected by the parallax detecting means and a parallax offset value; and
   parallax-offset-value correcting means configured to correct the parallax offset value based on a change in parallax corresponding to an object whose size in real space does not change with time, of the objects detected by the object detecting means, and a change in an apparent size of the object, wherein
   the parallax-offset-value correcting means calculates a parallax error based on the changes in parallax and the apparent size of the object, and corrects the parallax offset value based on the parallax error,
   the parallax-offset-value correcting means calculates the parallax error $\epsilon$ according to the following expression when parallax changes from $dp_1$ to $dp_2$ and the apparent size of the object changes from $b_1$ to $b_2$:

$$\epsilon = (b_1 \cdot dp_2 - b_2 \cdot dp_1)/(b_2 - b_1), \text{ and}$$

the parallax-offset-value correcting means corrects the parallax offset value based on the parallax error $\epsilon$.

2. The stereo-image processing apparatus according to claim 1, wherein the parallax-offset-value correcting means forms a histogram for a plurality of parallax errors calculated at different times, and corrects the parallax offset value based on the mode of the histogram.

3. The stereo-image processing apparatus the apparent size of the object is a width of the object in the images.

4. The stereo-image processing apparatus according to claim 1, wherein
   the detected object, which is determined to undergo an apparent change in size, is an object above a road surface.

5. The stereo-image processing apparatus according to claim 4, further comprising:
   taillight distance detecting means configured to detect a distance between right and left taillights of a preceding vehicle, wherein
   the object detecting means detects a preceding vehicle as the object whose size in real space does not change,
   the parallax-offset-value correcting means corrects the parallax offset value based on a change in parallax corresponding to the right and left taillights and a change in an apparent distance in the images between the right and left taillights of the preceding vehicle.

6. The stereo-image processing apparatus according to claim 4, further comprising:
   storage means configured to store parallax and the apparent size of the detected object,
   wherein, when the detected object is exchanged, a history of the storage means is cleared.

7. The stereo-image processing apparatus according to claim 6, wherein an exchange of the detected object is determined to occur when the object detection means detects that a second object entered into the image field of the stereo-image taking means.

8. The stereo-image processing apparatus according to claim 4, wherein
   the stereo-image taking means is configured to take a plurality of images from different viewpoints within an image field,
   a determination as to whether the detected object has undergone an apparent change in size is made by a comparing first image data with second image data, and the detected object is present in the image field during both a first period corresponding to the first image data and a second period corresponding to the second image data.

9. The stereo-image processing apparatus according to claim 1, wherein the object is a preceding vehicle.

10. A stereo-image processing apparatus comprising:
stereo-image taking means configured to take a plurality of images from different viewpoints;
parallax detecting means configured to detect parallax of a subject based on the images taken by the stereo-image taking means;
object detecting means configured to detect objects based on parallax detected by the parallax detecting means and a parallax offset value; and
parallax-offset-value correcting means configured to correct the parallax offset value based on a change in parallax corresponding to an object whose size in real space does not change with time, of the objects detected by the object detecting means, and a change in an apparent size of the object, wherein
the object detecting means detects a preceding vehicle as the object whose size in real space does not change with time, and
the parallax-offset-value correcting means corrects the parallax offset value based on a change in parallax corresponding to the preceding vehicle and a change in an apparent size of the preceding vehicle in the images serving as the apparent size of the object; and
the stereo-image processing apparatus further comprising taillight distance detecting means configured to detect a distance between right and left taillights of the preceding vehicle, wherein
the parallax-offset-value correcting means corrects the parallax offset value based on a change in parallax corresponding to the right and left taillights and a change in an apparent distance in the images between the right and left taillights of the preceding vehicle.

11. The stereo-image processing apparatus according to claim 10, further comprising:
storage means configured to store parallax and the apparent size of the object,
wherein, when the preceding vehicle detected by the object detecting means is exchanged, a history of parallax and the apparent size of the object stored in the storage means is cleared.

12. A stereo-image processing apparatus comprising:
stereo-image taking means configured to take, within an image field, a plurality of images from different viewpoints within the image field;
parallax detecting means configured to detect parallax of a subject based on the images taken by the stereo-image taking means;
object detecting means configured to detect objects based on parallax detected by the parallax detecting means and a parallax offset value; and
parallax-offset-value correcting means configured to correct the parallax offset value based on a change in parallax corresponding to a change in an apparent size of an object detected by the object detecting means, which object does not change in size in real space, wherein
a determination as to whether the detected object has undergone an apparent change in size is made by a comparing first image data with second image data,
the detected object is present in the image field during both a first period corresponding to the first image data and a second period corresponding to the second image data,
the parallax-offset-value correcting means calculates a parallax error $\epsilon$ according to the following expression when parallax changes from $dp_1$ to $dp_2$ and the apparent size of the object changes from $b_1$ to $b_2$:

$$\epsilon=(b_1 \cdot dp_2 - b_2 \cdot dp_1)/(b_2-b_1), \text{ and}$$

the parallax-offset-value correcting means corrects the parallax offset value based on the parallax error $\epsilon$.

13. The stereo-image processing apparatus according to claim 12, further comprising:
taillight distance detecting means configured to detect a distance between right and left taillights of a preceding vehicle, wherein
the object detecting means detects a preceding vehicle as the object whose size in real space does not change,
the parallax-offset-value correcting means corrects the parallax offset value based on a change in parallax corresponding to the right and left taillights and a change in an apparent distance in the images between the right and left taillights of the preceding vehicle.

14. The stereo-image processing apparatus according to claim 12, further comprising:
storage means configured to store parallax and the apparent size of the detected object,
wherein, when the detected object is exchanged, a history of the storage means is cleared.

15. The stereo-image processing apparatus according to claim 14, wherein an exchange of the detected object is determined to occur when the object detection means detects that a second object entered into the image field of the stereo-image taking means.

* * * * *